United States Patent [19]

Bizjak et al.

[11] Patent Number: 4,987,500
[45] Date of Patent: Jan. 22, 1991

[54] SELF COMPENSATING HIGH DENSITY DATA RECORDING AND DETECTION SCHEME

[75] Inventors: John Bizjak, San Jose; Michael Hassel, Milpitas; David Niemann, Santa Clara, all of Calif.

[73] Assignee: Brier Technology, Inc., San Jose, Calif.

[21] Appl. No.: 270,748

[22] Filed: Nov. 14, 1988

[51] Int. Cl.$^5$ .............................................. G11B 5/09
[52] U.S. Cl. ........................................ 360/46; 360/43
[58] Field of Search .................................. 360/46, 43

[56] References Cited

U.S. PATENT DOCUMENTS

| 4,495,529 | 1/1985 | Gustafson | 360/46 |
| 4,635,142 | 1/1987 | Haugland | 360/46 |
| 4,751,591 | 6/1988 | Fujimoto | 360/46 |

Primary Examiner—Vincent P. Canney
Attorney, Agent, or Firm—Hecker & Harriman

[57] ABSTRACT

The present invention utilizes a dual frequency data writing scheme. At a first frequency, flux transitions are achieved which result in large excursions of the information signal. In the preferred embodiment, the first frequency approximates the maximum frequency at which such excursions can occur. A second higher frequency is utilized to create the very small or no excursions. At this second higher frequency, a complex flux transition is not achieved. Therefore, there is little or no information signal. Information is represented by the presence or absence of excursions. In the preferred embodiment, the first frequency is approximately 33,000 flux changes per inch, and the second frequency is approximately 67,000 flux changes per inch. In order to detect data written by the present scheme, an adaptive, self-compensating scheme is utilized. The present invention utilizes an excursion detection scheme which is pattern and radii independent. This scheme is self-adjusting in real time and provides recovery of the nominal flux transition independent of the information pattern. Data recovery is qualified through use of a novel excursion detection scheme. This scheme compares variations in the tracking peak detect value with the input signal separated by an excursion threshold value. When the input waveform falls below the adaptive threshold voltage, a data transition is defined.

9 Claims, 3 Drawing Sheets

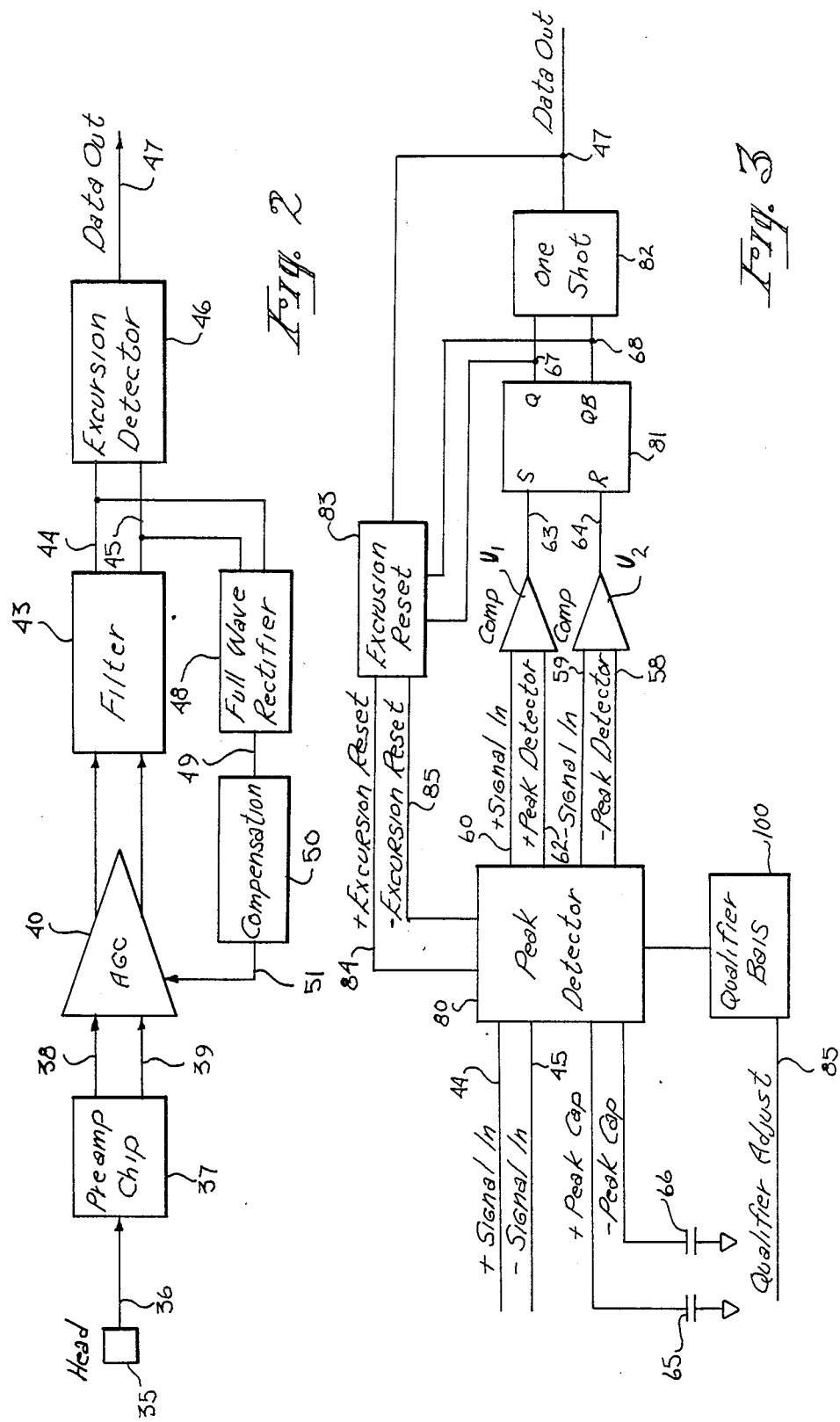

SELF COMPENSATING HIGH DENSITY DATA RECORDING AND DETECTION SCHEME

BACKGROUND OF THE PRESENT INVENTION

1. Field of the Invention

This invention relates to the field of data recording schemes for magnetic media storage systems.

2. Background Art

Mass storage for computer systems is typically provided by magnetic media storage systems, such as rigid or flexible disk storage systems. A rotating disk having a magnetic media layer on the surface is accessed by a "read/write" head which is used to store and retrieve information from the disk's surface. To store information on a magnetic media disk, flux reversals are induced in the magnetic particles comprising the disk's surface. When a magnetic read/write head is passed over the flux reversals, a signal is induced in the head which is sinusoidal in nature. In the prior art, detection of this information signal is typically amplitude-based. That is, the amplitude of the signal is used to indicate the present or absence of magnetic flux reversals. Reversals are then interpreted as "ones" or "zeros" according to the coding algorithm.

To maximize disk performance and storage capability, it is desired to increase the data density on the surface of the disk. This is accomplished by increasing the frequency of the flux transitions used to encode the digital data. However, as the data frequency increases, that is, as the flux reversals are moved closer to each other on the disk's surface, they interfere with each other, lowering the amplitude. The read/write head detects changes in the magnetic field on either side of a small gap in the head. If two written transitions are the same distance apart as the gap is long, the head can't note the flux change and detects no transition. This gap null area forms the upper limit of peak detection coding schemes. One prior art attempt to break this barrier uses zero crossing of the signal generated by the flux transition to indicate digital information. For example, in Heidecker, U.S. Pat. No. 3,603,942, a zero crossing data detection scheme is implemented. In Heidecker, two write frequencies are implemented. The first write frequency is used to create a zero crossing representing a zero (or "one"). A second write frequency, approximately twice that of the first, is used to create flux transitions so close together that no zero crossing results. This absence of a zero crossing represents a logical "one" (or zero). One disadvantage of the method of Heidecker is its reliance on pre-compensation of the information signal. Precompensation lowers the amplitude of the information signal and can introduce offset into the actual zero crossing location. In addition, inter-symbol interference (ISI) causes signal spread and reduces the slope at the zero crossing location. Finally, the pre-compensation scheme of Heidecker is pattern dependent. It would be desirable to provide a method for high-density data recording which is pattern independent.

Therefore, it is an object of the present invention to provide a high-density data recording and detection scheme which is pattern independent.

It is another object of the present invention to provide a high-density data recording and detection scheme which is less sensitive to the effects of inter-symbol interference.

It is yet another object of the present invention to provide a high-density data recording and detection scheme which does not rely on pre-compensation of the information signal.

It is still another object of the present invention to provide a high-density data recording and detection scheme which is self compensating for pattern induced AC and DC wave form shifts.

It is a still further object of the present invention to provide a high-density data recording and detection scheme which is less sensitive to AC and DC signal variations such as those induced by buried servo patterns.

SUMMARY OF THE PRESENT INVENTION

The present invention is employed with a dual frequency data writing scheme. At a first frequency, flux transitions are achieved which result in large excursions of the information signal. In the preferred embodiment, the first frequency approximates the maximum frequency at which such excursions can occur. A second higher frequency is utilized to create a small or no excursion of the information signal. Information (data) is represented by the presence or absence of an excursion. In the preferred embodiment, the second frequency is approximately twice the first frequency.

In order to detect data written by the present scheme, a self compensating recovery scheme is utilized. The present invention utilizes a self-compensation scheme which is pattern and radii independent. This self-compensation scheme is self-adjusting in real time and provides recovery of the ideal flux reversal independent of the information pattern. Data recovery is achieved through use of a novel excursion detection scheme. This scheme compares variations in the input signal with a nominal difference value which is maintained by a track peak detector derived from the input waveform itself. When the nominal difference value between the two waveforms is zero, a data transition is defined.

BRIEF DESCRIPTION OF THE DRAWINGS

FIG. 2 is a block diagram illustrating the read circuitry of the present invention.

FIG. 3 is a block diagram illustrating the excursion detector of the circuit of FIG. 4.

DETAILED DESCRIPTION OF THE PRESENT INVENTION

Figure 1:
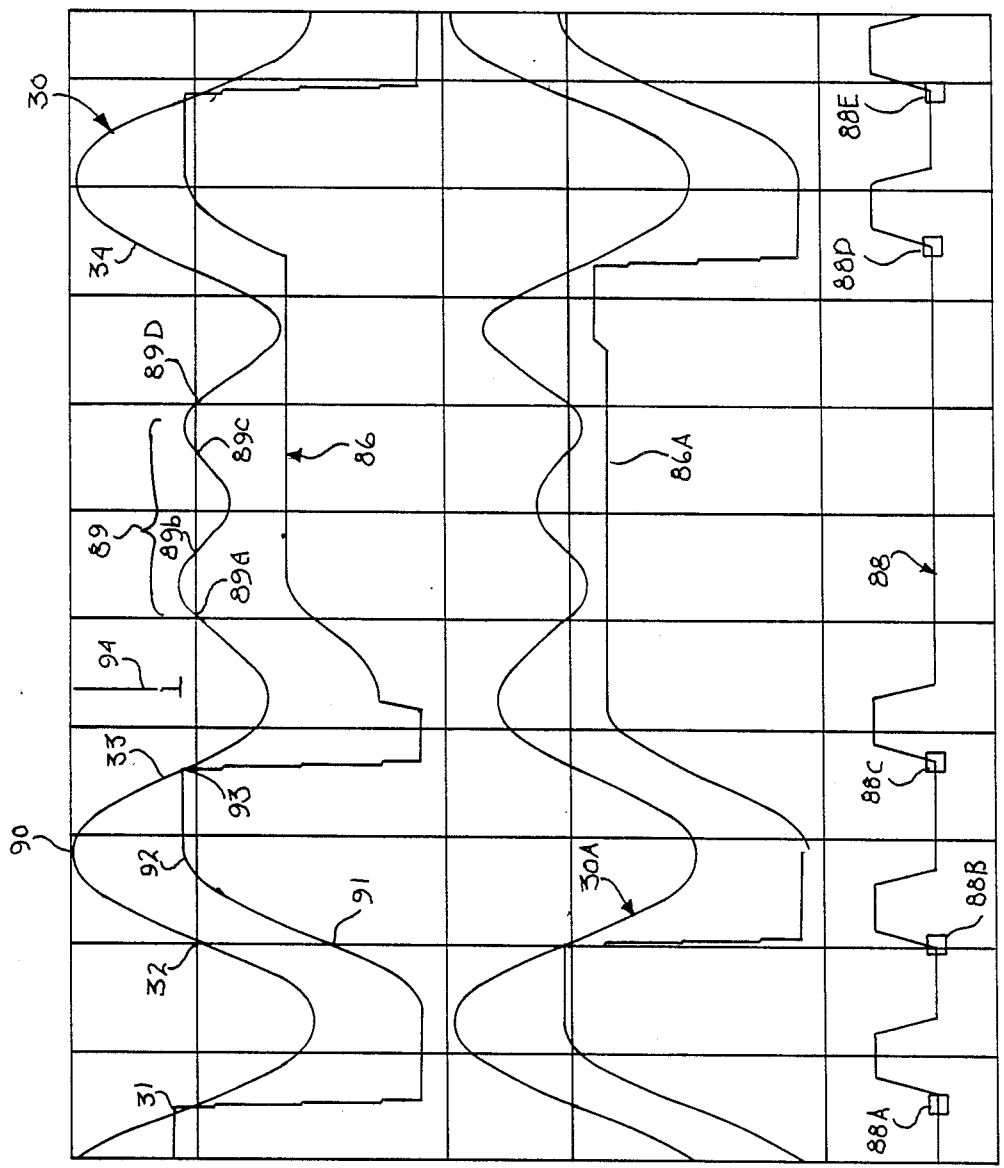
FIG. 1 is a timing diagram showing excursion detection of the present invention.

A self compensating high-density data recording and detection scheme is described. In the following description, numerous specific details such as write frequency, flux density, etc., are described in order to provide a more thorough understanding of the present invention. It will be apparent, however, to one skilled in the art, that the present invention may be practiced without these specific details. In other instances, well-known features have not been described in detail in order not to unnecessarily obscure the present invention.

The present invention is directed to a method and apparatus for high-density data recording and recovery. In magnetic media storage systems, information is stored digitally as logical "ones" and "zeros". These ones and zeros are encoded as flux transitions of the magnetic particles on the magnetic disk surface.

The capacity of a magnetic disk is dependent in part on the frequency of the flux transitions, i.e. the number of flux transitions per inch. The flux transitions are created when magnetic particles are made to align with a magnetic field generated by a read-write head. A flux transition is created when the polarity of the magnetic field of the write head is reversed, causing alignment of the magnetic particles in an opposite direction. The ability to recover these flux reversals is dependent on the head gap length, among other things. For a fixed rotation frequency of a magnetic disk, the ability to detect flux reversals is limited by the strength of the magnetic field generated in the read/write head.

In prior art peak detection data schemes, which rely on having sufficient amplitude for peak detection, the data density limit is defined substantially by the point at which flux reversals can no longer be detected. However, it is possible to take advantage of the fact that transitions do not occur at high data densities by utilizing a zero crossing data scheme. One such scheme is described in Heidecker. The system of Heidecker relies on pre-differentiation of the recording signal prior to recording to yield a write head current which will produce a flux pattern containing data information in zero crossings, rather than in peaks. The presence or absence of a zero crossing is used to indicate the presence or absence of a binary signal. The system of Heidecker does not utilize post-compensation of the read signal and in fact, teaches against it. The system of Heidecker has a number of disadvantages associated with its zero crossing detection scheme. The pre-differentiation lowers signal amplitude, making recovery, even of zero crossing points, more difficult and very sensitive to patterns encoded. Also, the zero crossing scheme is very sensitive to AC and DC biases induced by data patterns (block shift) and interference from servo information recorded below the data in buried servo systems.

The present invention is directed to a high-frequency, high-density data read/write scheme utilizing excursion detection to indicate data. In the present invention, a dual frequency writing scheme is utilized in which the first binary value is written at a first frequency and a second binary value is written at a second frequency. The second frequency is such that no complete flux transition can be detected and results in a very small signal excursion. The present invention employs a self-compensation detection scheme utilizing the excursion of the signal to indicate data.

By using the excursion itself, the actual magnetic flux reversal is sensed and maximum data density can be achieved. The excursion detection scheme of the present invention is pattern and radii independent, as well as self-adjusting in real time.

Due to wave form shifts and pattern induced offsets, the zero crossing point may not always represent the true midpoint of a flux transitions. Indeed, as density is increased, the wave form may not even cross zero, yet a significant flux reversal has occurred. Therefore, in the prior art, the density is limited by the detector's ability to account for wave form shifts. The present invention solves this problem by utilizing an excursion detection scheme. This defines a data transition in terms of the difference between a reference value developed form the continuously varying input signal and the input signal itself. This minimizes the detect window which must be implemented in order to decode data. Therefore, greater data density can be achieved utilizing the system of the present invention. The detection point occurs near the ideal flux reversal each time, independent of pattern or other AC and DC offsets. This allows lower quality heads and media to be utilized, while still maintaining high reliability and high data density.

Turning now to FIG. 1, the excursion detect method of the present invention is illustrated. Points 31–34 correspond to actual data transition points of wave form 30. Points 89A–89D correspond to zero crossings of a high frequency portion 89 of the input signal 30. However, these zero crossings do not represent true data transition points. The Heidecker scheme would indicate false data at these points. Section 89 is written at a higher frequency to indicate the absence of a transition and generally, the wave form at that section is above the zero line. However, due to wave form shift, false zero crossings such as at points 89A–89D occur. Thus, the read channel signal must be qualified to provide reliable data. The prior art teaches that one (or more) fixed threshold levels may be used around the zero crossing to qualify the data but these levels cannot accommodate pattern induced wave form shifts or AC and DC bias.

The present invention utilizes an excursion detection scheme to provide adaptive qualification to detect real data flux reversals. The read channel of the present invention incorporates an excursion detector which tracks the peak value of each flux reversal. This tracking value is maintained a predetermined level below the maximum amplitude of the input signal and is called the excursion threshold voltage. When the level of the input signal falls rapidly and when is equals the tracked value, a data transition is detected. Since any DC or AC offsets affect the input signal and the tracking signal by the same amount, the detection scheme is insensitive to these offsets. This insures that the highest possible data density can be employed and that AC or DC offsets induced by the pattern or buried servo are self compensated.

Still referring to FIG. 1, the operation of the excursion detection scheme is illustrated. The positive and negative input signals 30 and 30A respectively are coupled to a peak detector to produce peak value signals 86 and 86A respectively. The peak values are preset to zero but increase as the amplitude of the input signal increases. For example, the input signal 30 rises in amplitude from point 32 to peak value 90. Correspondingly, peak signal 86 rises in value from point 91 to point 92. At point 90, the input signal 30 begins to fall in amplitude. However, the peak signal 86 holds near the peak value. In the preferred embodiment of the present invention, the peak value is allowed to decay slightly (on the order of approximately 5%) to provide greater noise immunity. Once the amplitude of the input signal falls below the peak value, such as defined by difference 94, the peak signal 86 is reset, as at point 93, indicating a data transition point as at point 88C of data signal 88. These transition points 88A–88D occur when the difference value is detected.

Because a difference remains between the tracking value and the input signal at section 89, (the high frequency section), the signal remains near a constant level and no data transition is indicated. Thus, the present invention is independent of absolute peak values and relies instead on relative peak differences to define data transitions.

A block diagram illustrating the read channel of the present invention is illustrated in FIG. 2. The read channel of the present invention maintains a reference level a fixed difference from the peak of a data signal and generates pulses when the desired excursion is detected. A data signal from the read/write head 35 is coupled on line 36 to pre-amp 37. The outputs 38 and 39 of pre-amp 37 are coupled to the inputs of Automatic Gain Control (AGC) 40. The outputs 41 and 42 of AGC 40 are coupled to the inputs of filter 43. The outputs 44 and 45 of filter 43 are coupled to excursion detector 46. Outputs 44 and 45 of filter 43 are also coupled to full wave rectifier 48. The output 49 of full wave rectifier 48 is coupled to compensator 50. The output 51 of compensator 50 is coupled to AGC 40.

In the prior art, the type of detector used to translate flux transitions on magnetic media into digital pulses has been of two types. The first type detects the peak amplitude of the read signal and translates each peak into a pulse. The second type uses circuitry to differentiate the read signal and convert zero levels in the differentiated signals into pulses. Both of these systems require further qualification in order to identify real pulses and separate them from noise in lower resolution systems. The present invention is directed toward an "excursion" system, which looks for a fixed difference from the peak of the data and generates pulses when the desired excursion is detected. The analog data signal is continuously tracked and peak detected so that the excursion threshold amplitude is held by the peak detector. The peak detector output is then compared to the analog input signal. When the analog input signal falls below the peak level, a transition is detected. Since every transition is compared to its own peak, the detection system becomes insensitive to DC offsets and low-frequency AC bias. This is particularly useful in a buried servo system where there is a DC baseline shift with pattern variation and low-frequency noise from the buried servo.

Referring to FIG. 2, the head 35 acts as a transducer and receives a signal from the magnetic media spinning below it. That signal is amplified by the preamplifier 37. This amplified signal is converted to a consistent amplitude signal by the AGC circuit 40. The signal is then filtered and coupled in a feedback loop to the AGC through a full wave rectifier 48 and compensator 50. The excursion detector 46 is also coupled to the outputs 44 and 45 of filter 43 and is used to detect and hold the excursion threshold amplitude of a transition and digitize a pulse anytime the input signal falls below the excursion threshold.

A block diagram of the excursion detector 46 is illustrated in FIG. 3. The input signals 44 and 45 are coupled to the tracking peak detector 80. The peak detector 80 holds the maximum amplitude of the input signals at capacitors 65 and 66. The positive input signal 60 is compared to the positive peak signal 62 at comparator U1. The negative input signal 59 is compared to the negative peak signal 58 at comparator U2. When the input signal drops below the peak value, excursion is found. The output 63 of comparator U1 is coupled to the "S" input of latch 81. The output 64 of comparator U2 is coupled to the "R" input of latch 81. This guarantees that alternate polarity transitions are detected. Qualifier bias 100 sets the excursion threshold which defines the magnitude of the input waveform necessary to generate a data bit.

The Q output at node 67 of latch 81 is coupled to an input of one shot 82. The QB output at node 68 at latch 81 is coupled to a second input of one shot 82. Node 67 and 68 are also coupled to excursion reset 83. The output 47 of one shot 82 is the data output of the excursion detector and hence the entire read channel. Excursion reset 83 outputs signals 84 and 85 to reset the peak detectors after excursion has been detected.

This differs from the prior art in that a separate qualifier is not required. In the present invention, the data channel is the qualifier channel. When peaks vary in the level of occurrence, it is difficult to establish a threshold which will detect a "good" bit and not detect a "bad" bit. By using an excursion detection scheme of the present invention, this problem can be avoided. This is due to the fact that the excursion scheme of the present invention is a relative difference scheme as opposed to an absolute value scheme. Thus, wave form shifts do not affect the detection of data transitions in the present invention.

Figure 4:
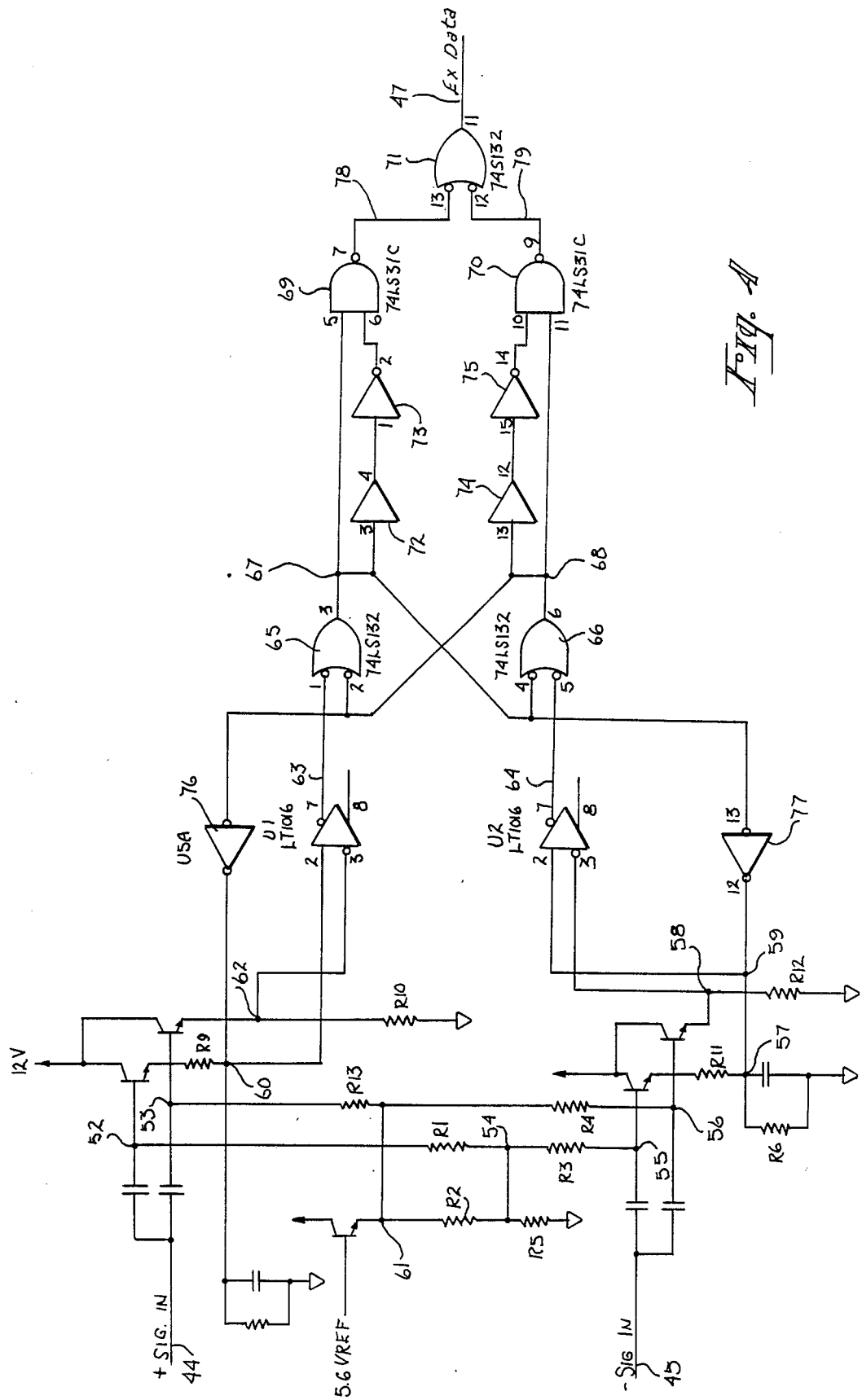
FIG. 4 is a circuit diagram illustrating the excursion detector of FIG. 3.

A circuit diagram of the excursion detector 46 is illustrated in FIG. 4. The input signal 44 from filter 43 is coupled to one terminal of capacitors C1 and C2 respectively. The output of capacitor C1 is coupled at node 52 to the base of transistor Q2. The collector of transistor Q2 is coupled to a voltage source VS which in the preferred embodiment of the present invention is approximately 12 volts. The collector of transistor Q2 is also coupled to the collector of transistor Q3. The emitter of transistor Q2 is coupled through resistor R9 to node 60. Node 60 is coupled to ground through resistor R7 and capacitor C5 in parallel.

Node 52 is also coupled to resistor R1 to node 54. Node 53 is coupled through resistor R13 to node 61. Node 61 is coupled to the emitter of transistor Q1. The base of transistor Q1 is coupled to a reference voltage VREF and the collector of transistor Q1 is coupled to reference voltage VS. Node 61 is also coupled through resistor R2 to Node 54. Node 54 is coupled through resistor R5 to ground and through resistor R3 to Node 55.

Input signal 45, which is the inverse of input signal 44, is coupled to capacitors C3 and C4. The output of capacitor C3 is coupled to Node 55. Node 55 is also coupled to the base of transistor Q4. The output of capacitor C4 is coupled to Node 56. Node 56 is coupled to the base of transistor Q5. The collector of transistors Q4 and Q5 are coupled to voltage source VS. The emitter of transistor Q4 is coupled through resistor R11 to Node 57. Node 57 is coupled through resistor R8 and capacitor C6 in parallel to ground. The emitter of transistor Q5 is coupled to Node 58. Node 58 is coupled through resistor R12 to ground.

The emitter of transistor Q3 is coupled to Node 62. Node 62 is coupled through resistor R10 to ground. Node 60 and 62 are coupled to the inputs of comparator U1. Nodes 58 and 59 are coupled to the inputs of comparator U2. Outputs 63 of comparator U1 is coupled to an input of NOR gate 65. The output 64 of comparator U2 is coupled to an input of NOR gate 66.

The output of NOR gate 65 at Node 67 is coupled to the other input of NOR gate 66 and to an input of NAND gate 69, forming a one shot. The output of NOR gate 66 at Node 68 is coupled to the other input of NOR gate 65 and into one input of NAND gate 70.

Node 67 is also coupled through inverter 72 to the input of inverter 73. The output of inverter 73 is coupled to the other input of NAND gate 69. The output 78 of NAND gate is 69 is coupled to one input of NOR gate 71.

Node 68 is coupled through inverter 74 to the input of inverter 75. The output of inverter 75 is coupled to the other input of NAND gate 70, forming a one shot. The output 79 of NAND gate 70 is coupled to the other input of NOR gate 71. Output 47 of NOR gate 71 is the output of excursion detector 46.

The signal at Node 68 is also inverted and coupled to inverter 76. The output of inverter 76 is coupled to Node 60. The signal at Node 67 is inverted and coupled to inverter 77. The output of inverter 77 is coupled to Node 59.

In operation, the analog signal is impressed on the bases of transistors Q2 and Q3 and the inverse signal is impressed on the bases of transistors Q4 and Q5. The emitters of transistors Q3 and Q5 act as buffers for the input signal and the emitters of transistors Q2 and Q4 do the peak detection. The AC components of the signal on all four transistor bases is the same. The emitters of transistors Q2 and Q4 charge capacitors C5 and C6. When the signal at the emitter of transistor Q2 decreases, the voltage on the capacitors back biases the transistors so they hold the previous voltage. The voltage divider at Q1, R2 and R5 sets the DC level between the signal and the tracking value (the excursion threshold). Comparators U1 and U2 change every time the signal drops below the tracking value. Inverters 76 and 77 discharge capacitor C5 and C6 to reset the tracking value to zero after each excursion is detected. NOR gates 65 and 66 form an RS latch which guarantees that alternate polarity transitions are detected. Inverters 72, 73, 74 and 75 and NAND gates 69 and 70 form one shots to set the pulse width of the output data.

Thus, the present invention provides a method and apparatus for achieving adaptive, self compensating high density data recording and detection while simultaneously qualifying the data. The present invention removes the effects of D.C. components and low frequency A.C. components. The present invention is thus able to achieve greater data density.

What is claimed is:

1. A method of detecting flux transitions of an input signal in a magnetic media storage system comprising the steps of:
    tracking a peak value of said input signal and maintaining the tracked value at a predetermined level below a maximum amplitude of said input signal;
    comparing the peak value of said input signal to said tracked value;
    defining a flux transition point as the point at which said peak value of said input signal becomes less than said tracked value.

2. The method of claim 1 wherein said input signal includes flux transitions written at first and second frequencies, said second frequency being greater than said first frequency.

3. The method of claim 2 wherein flux reversals written at said second frequency have a difference in amplitude less than said predetermined level.

4. The method of claim 3 further including the step of decaying the tracked value by a fixed amount to provide noise immunity.

5. An apparatus for detecting flux transitions of an input signal comprising:
    detection means for detecting said input signal;
    first tracking means coupled to said detection means for tracking a peak value of said input signal to generate a tracked value maintained at a predetermined value below a maximum level of said input signal;
    first comparing means coupled to said tracked value and said input signal for comparing said tracked value to the amplitude of said input signal, said first comparing means providing a first signal when said amplitude of said input signal is less than or equal to said tracked value;
    said first signal indicating a flux transition.

6. The apparatus of claim 5 further including reset means for resetting said first tracking means when said first signal is generated.

7. The apparatus of claim 6 wherein said flux transitions of said input signal occur at first and second frequencies, said second frequency being greater than said first frequency.

8. The apparatus of claim 7 wherein flux transitions written at said second frequency have a difference in amplitude less than said predetermined level.

9. A method of detecting flux transitions of an input signal in a magnetic storage system comprising the steps of:
    tracking the value of the input signal and maintaining a tracked value at a predetermined level below the maximum amplitude of each individual transition of the input signal;
    comparing the value of the input signal to the tracked value;
    defining a zero as the point at which the value of the input signal becomes less than the tracked value;
    resetting the tracked value when a zero is detected so that each transition is detected on its own and not in its relation to the amplitude or average amplitude of other pulses.

* * * * *